(12) United States Patent
Ladd et al.

(10) Patent No.: US 7,941,515 B2
(45) Date of Patent: May 10, 2011

(54) APPLYING A FILTER SET TO INFORMATION PROVIDED TO A SUBSCRIBING CLIENT

(75) Inventors: David A. Ladd, Lisle, IL (US); Kathleen A. McMurry, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 806 days.

(21) Appl. No.: 11/332,614

(22) Filed: Jan. 13, 2006

(65) Prior Publication Data

US 2007/0168510 A1      Jul. 19, 2007

(51) Int. Cl.
*G06F 15/173* (2006.01)
*G06F 15/16* (2006.01)

(52) U.S. Cl. ........ 709/223; 709/224; 709/225; 709/246; 370/254; 370/252; 341/50

(58) Field of Classification Search ............. 709/203, 709/229, 224, 315, 318, 206, 218, 220, 227, 709/246, 223, 238, 207; 719/315, 318; 370/389, 370/255, 254, 394, 392; 707/10, 3, 104.1, 707/5, 100, 103, 203, 526; 455/455; 704/270.1; 715/526

See application file for complete search history.

(56) References Cited

U.S. PATENT DOCUMENTS

| | | | | |
|---|---|---|---|---|
| 6,128,660 A * | 10/2000 | Grimm et al. | | 709/227 |
| 6,327,251 B1 * | 12/2001 | Bion | | 370/255 |
| 6,784,551 B2 * | 8/2004 | Auburger et al. | | 257/767 |
| 6,944,603 B2 * | 9/2005 | Bergan et al. | | 706/45 |
| 7,200,387 B1 * | 4/2007 | Ephraim et al. | | 455/418 |
| 7,310,339 B1 * | 12/2007 | Powers et al. | | 370/394 |
| 7,343,398 B1 * | 3/2008 | Lownsbrough | | 709/218 |
| 7,356,816 B2 * | 4/2008 | Goodman et al. | | 717/172 |
| 7,522,540 B1 * | 4/2009 | Maufer | | 370/254 |
| 2002/0013793 A1 * | 1/2002 | Bergan et al. | | 707/526 |
| 2002/0165912 A1 * | 11/2002 | Wenocur et al. | | 709/203 |
| 2003/0023755 A1 * | 1/2003 | Harris et al. | | 709/246 |
| 2003/0041110 A1 * | 2/2003 | Wenocur et al. | | 709/206 |
| 2003/0041125 A1 * | 2/2003 | Salomon | | 709/220 |
| 2003/0126136 A1 * | 7/2003 | Omoigui | | 707/10 |
| 2004/0076155 A1 * | 4/2004 | Yajnik et al. | | 370/389 |

(Continued)

FOREIGN PATENT DOCUMENTS

EP        1753199 A1 *     2/2007

OTHER PUBLICATIONS

Roach, Session Initiation Protocol (SIP)-Specific Event Notification, Jun. 2002, The Internet Society.*

(Continued)

*Primary Examiner* — Quang N. Nguyen
*Assistant Examiner* — Michael Martinez
(74) *Attorney, Agent, or Firm* — Baker Botts L.L.P.

(57) ABSTRACT

Applying a filter to state information sent from a server to a subscribing client includes receiving a subscription request from the subscribing client, where the subscription request requests a subscription for the subscribing client. A subscriber value is established from the subscription request. A filter set corresponding to the subscriber value is implicitly determined. The filter set comprises one or more filters, where a filter operates to filter state information sent from a server to the subscribing client. The filter set is recorded in a subscription record of the subscription for the subscribing client.

20 Claims, 1 Drawing Sheet

U.S. PATENT DOCUMENTS

| | | | |
|---|---|---|---|
| 2004/0181754 A1* | 9/2004 | Kremer et al. | 715/526 |
| 2004/0221268 A1* | 11/2004 | Nichols et al. | 717/124 |
| 2004/0246965 A1* | 12/2004 | Westman et al. | 370/392 |
| 2004/0254937 A1* | 12/2004 | Gernold | 707/10 |
| 2005/0010635 A1* | 1/2005 | Schwesig et al. | 709/203 |
| 2005/0050150 A1* | 3/2005 | Dinkin | 709/207 |
| 2005/0055399 A1* | 3/2005 | Savchuk | 709/203 |
| 2005/0071849 A1* | 3/2005 | Hinson et al. | 719/315 |
| 2005/0155036 A1* | 7/2005 | Tiainen et al. | 719/310 |
| 2005/0203949 A1* | 9/2005 | Cabrera et al. | 707/103 R |
| 2005/0232401 A1* | 10/2005 | Ordille et al. | 379/88.22 |
| 2006/0041431 A1* | 2/2006 | Maes | 704/270.1 |
| 2006/0059165 A1* | 3/2006 | Bosloy et al. | 707/10 |
| 2006/0094441 A1* | 5/2006 | Beckmann et al. | 455/455 |
| 2006/0218194 A1* | 9/2006 | Yalamanchi | 707/104.1 |
| 2006/0242140 A1* | 10/2006 | Wnek | 707/5 |
| 2006/0242166 A1* | 10/2006 | Larcheveque et al. | 707/100 |
| 2007/0016673 A1* | 1/2007 | Shinohara et al. | 709/224 |
| 2007/0038610 A1* | 2/2007 | Omoigui | 707/3 |
| 2007/0061815 A1* | 3/2007 | Graham et al. | 719/313 |
| 2007/0150574 A1* | 6/2007 | Mallal et al. | 709/223 |
| 2007/0168420 A1* | 7/2007 | Morris | 709/204 |
| 2007/0213980 A1* | 9/2007 | Danner et al. | 704/231 |
| 2007/0240166 A1* | 10/2007 | Marappan | 719/318 |
| 2007/0298344 A1* | 12/2007 | Maruyama et al. | 430/109.1 |
| 2008/0162498 A1* | 7/2008 | Omoigui | 707/10 |
| 2008/0294794 A1* | 11/2008 | Darugar et al. | 709/238 |

OTHER PUBLICATIONS

Rahman et al., A Session Initiation Protocol (SIP) Event Package for Device Information, Oct. 2004, The Internet Society.*

Johnston, Alan B. SIP understanding the Session Initiation Protocol. Boston: Artech House, 2004.*

Simple Object Access Protocol (SOAP) 1.1. World Wide Web Consortium—Web Standards. May 8, 2000.*

"Developing Weblications with Sash 2.1." IBM Redbooks. Feb. 2002.*

Technical Specification Group Services and System Aspects, TSGS#19(03)0301, Source: TSG SA WG2, Title: CRs on 23.141, Agenda Item 7.2.3, Meeting #20, Hämeenlinna, Finland, 17 total pages, Jun. 9-Dec. 12, 2003.

H. Khartabil, et al., "Functional Description of Event Notification Filtering", Internet-Draft, Copyright © The Internet Society 2005, http://www.ietf.org/internet-drafts/draft-ietf-simple-event-filter-funct-05.txt, 29 pages, Mar. 15, 2005.

* cited by examiner

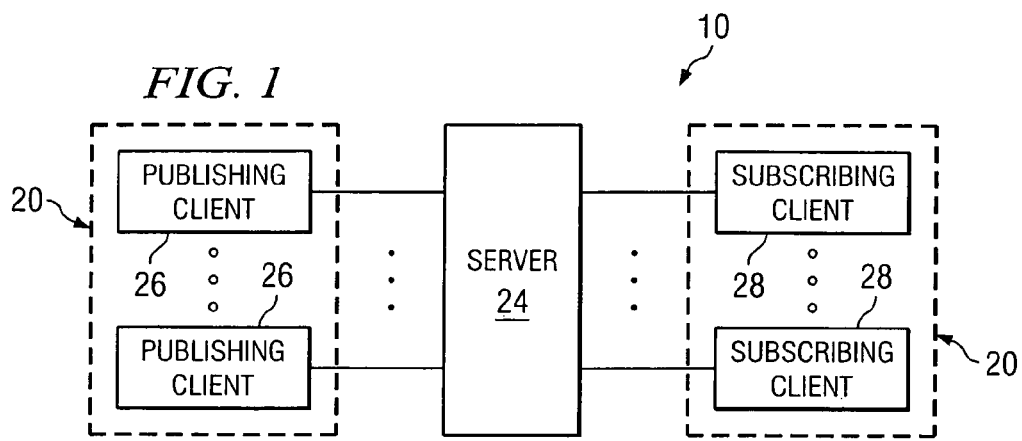
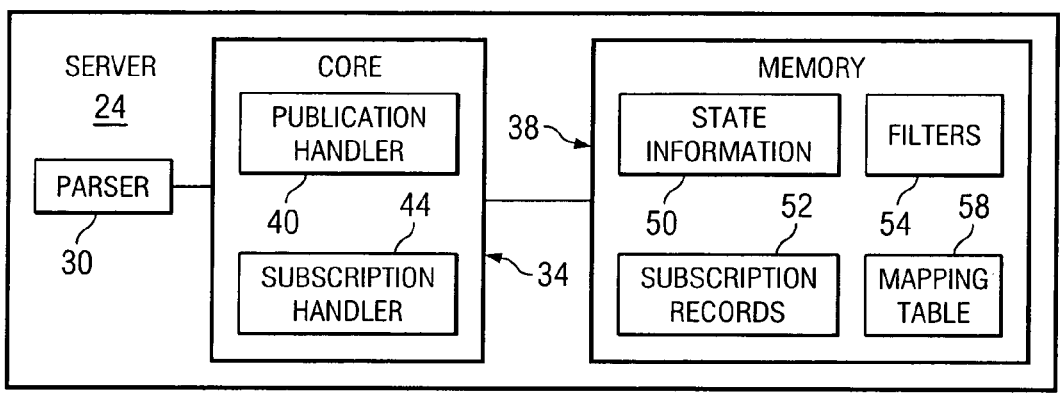
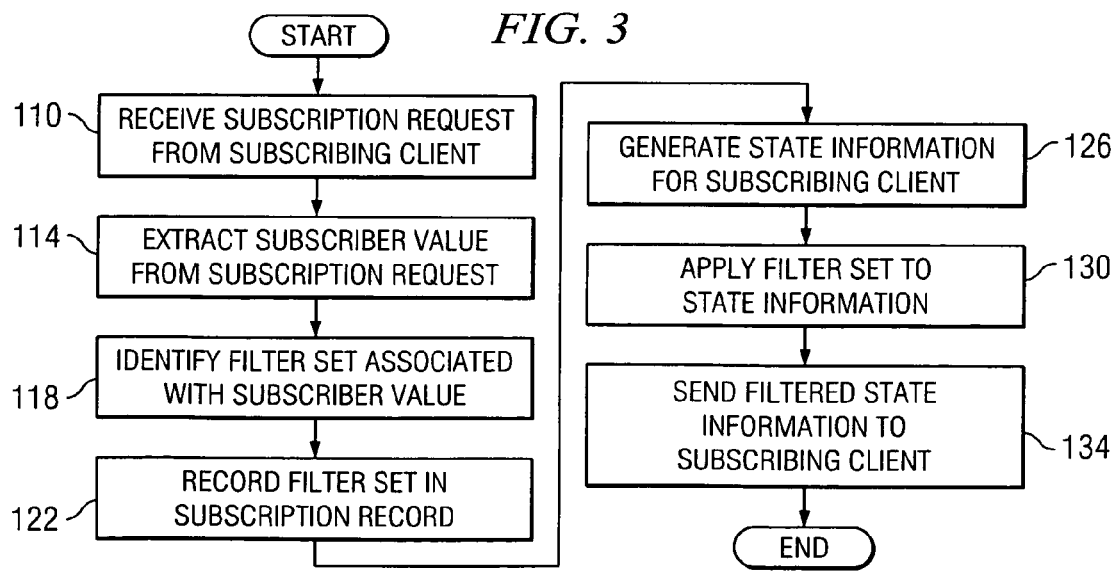

US 7,941,515 B2

APPLYING A FILTER SET TO INFORMATION PROVIDED TO A SUBSCRIBING CLIENT

TECHNICAL FIELD

This invention relates generally to the field of telecommunications and more specifically to applying a filter set to information provided to a subscribing client.

BACKGROUND

In a client-server system, a server may provide information to a client. In some cases, the software of the server and the software of the client may not be compatible. In these cases, information provided by the server may not be usable by the client. For example, documents provided by the server may not be readable by the client. Known techniques for making the server information compatible with the client software include applying a filter to the information. These known techniques, however, are unsatisfactory in certain situations. It is generally desirable to have satisfactory techniques for making server information compatible with the client software.

SUMMARY OF THE DISCLOSURE

In accordance with the present invention, disadvantages and problems associated with previous techniques for applying a filter to information sent from a server to a client may be reduced or eliminated.

According to one embodiment of the present invention, applying a filter to state information sent from a server to a subscribing client includes receiving a subscription request from the subscribing client, where the subscription request requests a subscription for the subscribing client. A subscriber value is established from the subscription request. A filter set corresponding to the subscriber value is implicitly determined. The filter set comprises one or more filters, where a filter operates to filter state information sent from a server to the subscribing client. The filter set is recorded in a subscription record of the subscription for the subscribing client.

Certain embodiments of the invention may provide one or more technical advantages. A technical advantage of one embodiment may be that a filter set of one or more filters corresponding to a subscribing client may be determined. A server may apply the filter set to information to make the information compatible with the software of the client. Another technical advantage of one embodiment may be that the filter set may be recorded in a subscription record for the subscribing client. When information is generated for the client, the filter set may be readily identified and applied to the information.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a system that includes a server that applies a filter set to information provided to a subscribing client;

FIG. 2 is a block diagram illustrating one embodiment of a server that may be used with the system of FIG. 1; and FIG. 3 is flowchart illustrating one embodiment of a method for applying a filter set to information provided to a subscribing client.

DETAILED DESCRIPTION OF THE DRAWINGS

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 that includes a server 24 that applies a filter set to information provided to a subscribing client 28. According to the embodiment, server 24 implicitly determines a filter set corresponding to subscribing client 28. The filter set may be recorded in a subscription record for subscribing client 28 to allow the filter set to be readily identified. The filter set may be applied to information to make the information compatible with the software of subscribing client 28. According to one embodiment, server 24 may comprise a presence server and the information may comprise presence information.

According to one embodiment, system 10 operates to provide services during a communication session. A communication session may refer to an active communication between endpoints, measured from endpoint to endpoint. Information may be communicated during a communication session. Information may refer to voice, data, text, audio, video, multimedia, control, signaling, other information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) standards, the International Telecommunications Union (ITU-T) standards, the European Telecommunications Standards Institute (ETSI) standards, the Internet Engineering Task Force (IETF) standards, or other standards.

System 10 includes components such as devices. In general, a device may include any suitable arrangement of components operable to perform the operations of the device. As an example, a device may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes one or more clients 20 coupled to a server 24 as shown. In certain situations, software of clients 20 may not be compatible with software of server 24. In these situations, clients 20 may not be able to use information provided by server 24. Server 24 implicitly determines a filter set that may be applied to the information to make the information compatible with clients 20.

According to the embodiment, client 20 represents any suitable device operable to communicate with server 24. Client 20 may comprise, for example, a personal digital assistant, an instant messaging device, a computer such as a laptop, a cellular telephone, a network device such as a gateway, a controller, or another server, a mobile handset, or any other device operable to communicate with server 24. A client 20 may have a client identifier that uniquely identifies client 20.

Clients 20 include one or more publishing clients 26 and one or more subscribing clients 28. A client 20 may be a publishing client, a subscribing client, or both a publishing and subscribing client. Publishing clients 26 publish state information to server 24. The information may be published according to any suitable publication schedule. Subscribing clients 28 subscribe to state information from server 24. The information may be provided to subscribing clients 28 according to any suitable subscription schedule.

Server 24 manages state information by providing state information from publishing clients 26 to subscribing clients 28. According to one embodiment, server 24 may comprise a presence server that manages presence information. Server 24, however, may comprise any suitable server, for example, a call server. More than one server 24 may be used for, for example, load balancing or redundancy purposes.

According to one embodiment, server 24 implicitly determines a filter set corresponding to subscribing client 28. The filter set may be recorded in a subscription record for subscribing client 28 to allow the filter set to be readily identified. An example server 24 is described in more detail with reference to FIG. 2.

System 10 may include other suitable devices, for example, one or more networks, gateways, or authorization servers. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. A gateway may interconnect with networks and may convert communications between different communication protocols. An authorization server may provide authorization-related services.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of server 24 may be performed by more than one module. Additionally, operations of system 10 may be performed using any suitable logic. As used in this document, "each" refers to each member of a set or each member of a subset of a set.

FIG. 2 is a block diagram illustrating one embodiment of server 24 that may be used with system 10 of FIG. 1. According to the embodiment, server 24 implicitly determines a filter set corresponding to subscribing client 28. The filter set may be recorded in a subscription record for subscribing client 28 to allow the filter set to be readily identified.

According to the illustrated embodiment, server 24 includes a parser 30, a core 34, and a memory 38 coupled as shown. Core 34 includes a publication handler 40 and a subscription handler 44, and memory stores state information 50, subscription records 52, filters 54, and mapping table 58.

Parser 30 parses messages, and may comprise, for example, an SIP parser. Core 34 includes the applications of server 24, such as publication handler 40 and subscription handler 44. Publication handler 40 receives and stores state information 50, for example, presence information. According to one embodiment, publication handler 40 may receive a message such as an update message, decode the message to obtain state information 50, and then store state information 50.

State information 50 may refer to information that describes the current condition of an object. State information 50 may be stored as a state object, which may be updated periodically or as the state of the object changes. According to one embodiment, state information 50 may be configured according to the Session Initiation Protocol (SIP). State information 50 may be represented in any suitable format, for example, an extensible markup language (XML) format.

State information 50 may describe the state of any suitable object, such as the event state of a user. As an example, presence information may describe the presence of a user. Presence may refer to an aspect of a user relevant to a communication session, for example, the location of a user, the availability of a user, the ability to reach a user, the preferred modes of communication for a user, other aspect, or any combination of the preceding. Examples of presence information include whether a user is currently logged into a particular network, a wireless network in which a user is located, whether a user has used a particular component within a predetermined time period, or an activity presently scheduled for a user.

Subscription handler 44 manages subscriptions of subscribing clients 28. According to one embodiment, subscription handler 44 processes a subscription request, such as a subscribe message, for a subscription, and generates a subscription record 52 describing the subscription. Subscription handler 44 creates a subscription object that listens to changes in state information 28 for the subscription, and provides subscribing client 28 with state information 50 according to subscription record 52.

Subscription records 52 describe the subscriptions of subscribing clients 28. A subscription record 52 may include any suitable subscription parameters describing a subscription. Subscription parameters may include, for example, subscribing client parameters, provided information parameters, subscription schedule parameters, filtering parameters, other suitable parameters, or any combination of the preceding.

Subscribing client parameters describe subscribing client 28. As an example, a subscribing client parameter may identify the type of device of subscribing client 28. Example device types include a telephone, cell phone, instant messaging device, computer, server, other device type, or any combination of the preceding. As another example, a subscribing client parameter may identify the link used by subscribing client 28. As another example, a subscribing client parameter may identify the vendor and version of the software of subscribing client 28.

Provided information parameters describe the type of state information provided to subscribing client 28. The provided information parameters may be designated by subscribing client 28 or by another party that can control the information provided to subscribing client 28. Subscription schedule parameters describe temporal features of the subscription.

Temporal features may include, for example, the duration of the subscription, the starting and ending times of the subscription, the frequency of updates, other feature, or any combination of the preceding.

Filter parameters describe filter sets of one or more filters 54 that may be applied to information provided to subscribing client 28. A filter 54 may refer to a software module that performs any suitable processing. According to one embodiment, a filter 54 may perform a structural modification to information to make the information compliant with subscribing client 28. A filter 54 may be designed to include or exclude certain elements to make the data compatible with client 20. As an example, a filter 54 may be designed to include or exclude certain XML elements.

According to another embodiment, a filter 54 may establish or modify a subscription parameter. As an example, a filter 54 may establish a subscription schedule parameter that designates an update for a subscription. As another example, a filter 54 may modify a provided information parameter to restrict information provided to subscribing client 28.

According to the embodiment, subscription handler 44 may explicitly or implicitly establish the subscription parameters for a subscription. Subscription handler 44 may explicitly establish the subscription parameters by using the parameters provided in a subscription request. For example, a subscription request may include subscription schedule parameters of the subscription.

Subscription handler 44 may implicitly establish subscription parameters by inferring them from subscriber values provided in a subscription request. A subscriber value may describe subscribing client 28 or the subscription requested by subscribing client 28. For example, a subscriber value may comprise a client identifier or a subscription parameter. A subscriber value may be found in any suitable part of a subscription request, such as the header. For example, the subscriber value may comprise a user-agent header value or an address or domain of the origin.

According to one embodiment, subscription handler 44 may implicitly establish filtering parameters. According to the embodiment, subscription handler 44 may determine a subscriber value from a subscription request from subscribing client 28, identify a filter set associated with subscribing client 28 according to mapping table 58, and record the filter set in subscription record 52 for subscribing client 28.

Mapping table 58 may map subscription values to associated filter sets. A filter set may be associated with a subscription value of a subscription request from subscribing client 28 if the filter set is to be applied to information provided to subscribing client 28.

The associations may be based on any suitable factor. As a first example, the association may be based on the format capability of subscribing client 28. The format capability may refer to the ability of client software to use data that conforms to a specific format. Subscribing client 28 may be unable to use certain elements, for example, may be unable to parse PDF documents that include person or device elements. The format capability may be identified by a subscription value such as a device type of subscribing client 28.

As a second example, the association may be based upon the device type of subscribing client 28. For example, if the device is a phone, a filter compatible with the phone may be used.

As a third example, the association may be based on a restriction on information provided to subscribing client 28. For example, certain types of information may or may not be provided to subscribing clients 28 having a particular DNS domain. The restrictions may be based on, for example, policy decisions. For example, a policy decision may specify that a client 28 may receive telephone information from presence server 24 and receive instant messaging information from other servers.

As a fourth example, the association may be based on a link between server 24 and subscribing client 28. For example, the association may be based upon the speed of the link, which may be determined from the domain of origin. If a link is a slow link, for example, a PCS link, a filter with fewer updates may be used.

Modifications, additions, or omissions may be made to server 24 without departing from the scope of the invention. The components of server 24 may be integrated or separated according to particular needs. Moreover, the operations of server 24 may be performed by more, fewer, or other modules. For example, the operations of handlers 40 and 44 may be performed by one module, or the operations of subscription handler 44 may be performed by more than one module. Additionally, operations of server 24 may be performed using any suitable logic.

FIG. 3 is flowchart illustrating one embodiment of a method for filtering state information. According to one embodiment, a filter set corresponding to subscribing client 28 may be implicitly determined. The filter set may be recorded in a subscription record for subscribing client 28 to allow the filter set to be readily identified.

The method begins at step 110, where server 24 receives a subscription request from subscribing client 28. The subscription request may comprise a subscribe message, and may have a header that has a subscriber value.

The subscriber value is extracted from the subscription request at step 114. The subscriber value may identify the software used by subscribing client 28. A filter set associated with the subscriber value is identified from at step 118. A filter set may include one or more filters that may be applied to information to make the information compatible with the software used by subscribing client 28.

The filter set is recorded in the subscription record 52 for subscribing client 28 at step 122. Subscription record 52 includes subscription parameters describing the subscription. State information 50 for subscribing client 28 is generated at step 126. The state information may include presence data generated in accordance with subscription schedule parameters of subscription record 52.

The filter set is applied to state information 50 at step 130. The filter set may be applied to the presence data to make state information 50 compatible with the software of subscribing client 28. The filtered state information 50 is sent to subscribing client 28 at step 134. After sending the filtered state information 50, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a filter set of one or more filters corresponding to a subscribing client may be determined. A server may apply the filter set to information to make the information compatible with the software of the client. Another technical advantage of one embodiment may be that the filter set may be recorded in a subscription record for the subscribing client. When information is generated for the client, the filter set may be readily identified and applied to the information.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for applying a filter to state information sent from a server to a client, comprising:
    receiving a subscription request from a subscribing client, the subscription request requesting a subscription for the subscribing client;
    establishing a subscriber value from the subscription request, the subscriber value comprising a device type that identifies a format capability of the subscribing client indicating that the subscribing client cannot parse an element of a Portable Document Format (PDF) document;
    the device type identifying a cellular telephone device type;
    determining a filter set corresponding to the format capability, the filter set comprising one or more filters each configured to filter state information sent from the server to the subscribing client, a first filter configured to exclude the element that the subscribing client cannot parse;
    obtaining the state information for the subscribing client, the state information placed in a PDF document comprising the element; and
    applying the first filter to the state information to exclude the element from the PDF document.

2. The method of claim 1, further comprising:
    obtaining the state information for the subscribing client;
    applying the filter set to the state information; and
    sending the filtered state information to the subscribing client.

3. The method of claim 1, wherein the state information further comprises presence information.

4. The method of claim 1, wherein:
    the subscriber value indicates a link speed is slow; and
    a second filter of the filter set provides fewer updates.

5. The method of claim 1, wherein:
    the subscriber value indicates software used by the subscribing client.

6. The method of claim 1, wherein:
    the subscriber value indicates a device type of the subscribing client.

7. A system for applying a filter to state information sent from a server to a client, comprising:
    a memory operates to:
        store state information;
    an interface operates to:
        receive a subscription request from a subscribing client, the subscription request requesting a subscription for the subscribing client; and
    a subscription handler coupled to the interface and to the memory, the subscription handler operates to:
        establish a subscriber value from the subscription request, the subscriber value comprising a device type that identifies a format capability of the subscribing client indicating that the subscribing client cannot parse an element of a Portable Document Format (PDF) document;
        the device type identifying a cellular telephone device type;
        determine a filter set corresponding to the format capability, the filter set comprising one or more filters each configured to filter state information sent from the server to the subscribing client, a first filter configured to exclude the element that the subscribing client cannot parse;
        obtain the state information for the subscribing client, the state information placed in a PDF document comprising the element; and
        apply the first filter to the state information to exclude the element from the PDF document.

8. The system of claim 7, the subscription handler further operable to:
    obtain the state information for the subscribing client;
    apply the filter set to the state information; and
    send the filtered state information to the subscribing client.

9. The system of claim 7, wherein the state information further comprises presence information.

10. The system of claim 7, wherein:
    the subscriber value indicates a link speed is slow; and
    a second filter set provides fewer updates.

11. The system of claim 7, wherein:
    the subscriber value indicates software of the subscribing client.

12. The system of claim 7, wherein:
    the subscriber value indicates a device type of the subscribing client.

13. A non-transitory computer readable storage medium storing logic for applying a filter to state information sent from a server to a client, the logic when executed by a processor performs the following:
    receive a subscription request from a subscribing client, the subscription request requesting a subscription for the subscribing client;
    establish a subscriber value from the subscription request, the subscriber value comprising a device type that identifies a format capability of the subscribing client indicating that the subscribing client cannot parse an extensible markup language (XML) element of a Portable Document Format (PDF) document;
    the device type identifying a cellular telephone device type;
    determine a filter set corresponding to the format capability, the filter set comprising one or more filters each configured to filter state information sent from the server to the subscribing client, a first filter configured to exclude the element that the subscribing client cannot parse;
    record the filter set in a subscription record of the subscription for the subscribing client;
    obtain the state information for the subscribing client, the state information placed in a PDF document comprising the element; and
    apply the first filter to the state information to exclude the element from the PDF document.

14. The non-transitory computer readable storage medium of claim 13, the logic further operates to:
    obtain the state information for the subscribing client;
    apply the filter set to the state information; and
    send the filtered state information to the subscribing client.

15. The non-transitory computer readable storage medium of claim 13, wherein the state information further comprises presence information.

16. The non-transitory computer readable storage medium of claim 13, wherein:
   the subscriber value indicates the subscriber value indicates the link speed is slow; and
   a second filter of the filter set provides fewer updates.

17. The non-transitory computer readable storage medium of claim 13, wherein:
   the subscriber value indicates software used by the subscribing client.

18. The non-transitory computer readable storage medium of claim 13, wherein:
   the subscriber value indicates a device type of the subscribing client.

19. A system for applying a filter to state information sent from a server to a client, comprising:
   means for receiving a subscription request from a subscribing client, the subscription request requesting a subscription for the subscribing client;
   means for establishing a subscriber value from the subscription request, the subscriber value comprising a device type that identifies a format capability of the subscribing client indicating that the subscribing client cannot parse an extensible markup language (XML) element of a Portable Document Format (PDF) document;
   the device type identifying a cellular telephone device type;
   means for determining a filter set corresponding to the format capability, the filter set comprising one or more filters each configured to filter state information sent from the server to the subscribing client, a first filter configured to exclude the element that the subscribing client cannot parse;
   means for obtain the state information for the subscribing client, the state information placed in a PDF document comprising the element; and
   means for applying the first filter to the state information to exclude the element from the PDF document.

20. A method for applying a filter to state information sent from a server to a client, comprising:
   receiving a subscription request from a subscribing client, the subscription request requesting a subscription for the subscribing client;
   establishing a subscriber value from the subscription request, the subscriber value comprising a device type and indicating:
   a format capability of the subscribing client indicating that the subscribing client cannot parse an extensible markup language (XML) element of a Portable Document Format (PDF) document;
   the device type identifying a cellular telephone device type;
   software of the subscribing client; and
   a device type of the subscribing client;
   determining a filter set corresponding to the format capability, the filter set comprising one or more filters each configured to filter state information sent from a server to the subscribing client, a first filter configured to exclude the element that the subscribing client cannot parse, a second filter of the filter set provides fewer updates, the filter set operates to make the state information compatible with the software used by the subscribing client, the state information comprising presence information;
   recording the filter set in a subscription record of the subscription for the subscribing client;
   obtaining the state information for the subscribing client, the state information placed in a PDF document comprising the element;
   applying the filter set to the state information to exclude the element from the PDF document; and
   sending the filtered state information to the subscribing client.

* * * * *